United States Patent [19]
Bieker et al.

[11] Patent Number: 5,343,984
[45] Date of Patent: Sep. 6, 1994

[54] ROTATING DRIVE FOR AN ADJUSTING SPINDLE OF A DISK BRAKE FOR MOTOR VEHICLES

[75] Inventors: Dieter Bieker, Munich; Johann Iraschko, Schweitenkirchen; Werner Stein, Remscheid, all of Fed. Rep. of Germany

[73] Assignee: Knorr-Bremse AG, Fed. Rep. of Germany

[21] Appl. No.: 18,241

[22] Filed: Feb. 16, 1993

[30] Foreign Application Priority Data

Feb. 13, 1992 [DE] Fed. Rep. of Germany ....... 4204307

[51] Int. Cl.$^5$ ............................................. F16D 65/40
[52] U.S. Cl. ............................. 188/71.9; 188/196 V
[58] Field of Search ................ 188/71.7, 71.8, 71.9, 188/72.1, 72.7, 72.8, 72.9, 196, 196 B; 192/111 A, 111 B, 111 T

[56] References Cited

U.S. PATENT DOCUMENTS 1,831,125 11/1931 Lambert ............................ 188/72.8
3,435,691 4/1969 Cock et al. ......................... 188/72.7
4,429,768 2/1984 Margetts et al. .................... 188/72.8

FOREIGN PATENT DOCUMENTS

WO9119115 12/1991 PCT Int'l Appl. .

Primary Examiner—Robert J. Oberleitner
Assistant Examiner—Chris Schwartz
Attorney, Agent, or Firm—Pollock, Vande Sande & Priddy

[57] ABSTRACT

A rotating drive for an adjusting spindle of a disk brake for motor vehicles, in particular street vehicles, has a cam lever (4), which can be rotated around an axis (19) parallel to the brake disk, comprising one cantilever (23) on each side of said lever comprising angular offset radial boreholes (24, 24') which receive radial pins (17, 17'). The pins (17, 17') reach into the double forked end of a drive lever (15), which can be rotated around an axis (20), crossing at right angles at a distance from the axis (19). The rotational movements of the drive lever (15) are transferred to a reset drive, which belongs to an adjusting spindle extending at right angles to the plane of the brake disk.

5 Claims, 2 Drawing Sheets

ROTATING DRIVE FOR AN ADJUSTING SPINDLE OF A DISK BRAKE FOR MOTOR VEHICLES

FIELD OF THE INVENTION

The invention relates to a rotating drive for an adjusting spindle of a disk brake for motor vehicles, in particular street vehicles, wherein the disk brake comprises a caliper, which extends over a brake disk and one of whose sides is provided with a clamping mechanism, which comprises a cam lever pivotable around an axis of rotation extending parallel to the plane of the brake disk. The cam lever comprises a cam coupled in the direction of movement at least approximately at right angles to the plane of the brake disk to substantially one adjusting spindle, which extends at least at a right angle to the plane of the brake disk and which is screwed adjustably to the cam or an intermediate piece (traverse) movable by the cam and against whose end facing the brake disk is braced a brake lining movable transversely to the caliper. To adjust the releasing play, a pin which protrudes substantially radially from the cam lever is connected to the cam lever, the pin extending into a recess of a drive lever which is coupled twist-proof to a reset drive belonging to the adjusting spindle.

BACKGROUND OF THE INVENTION

It can be inferred from WO 91/19115 that the clamping mechanism of the aforementioned disk brake can be equipped with one central adjusting spindle or two adjusting spindles mounted on both sides.

A similar disk brake comprising two adjusting spindles is known from WO 92/00466. A disk brake of similar design, equipped with two adjusting spindles but with a deviating reset drive for the adjusting spindles, can also be inferred from DE-OS 37 16 202.

SUMMARY OF THE INVENTION

The object of the invention is to design the rotating drive for the adjusting spindle for a disk brake of the aforementioned kind in such a manner that the rotating drive is mechanically sturdy, virtually wear-free, inexpensive and easy to assemble, requires only a small unit volume and can handle an adequately large rotation even in extreme cases, for example, following replacement of the lining. At the same time, the axis of rotation of the adjusting spindle and the cam lever must not intersect, but rather cross at a specific distance at approximately right angles.

This problem with a rotating drive of the aforementioned kind is solved according to the invention by arranging two radially protruding pins, the ends of which engage in two transversely offset recesses arranged on the drive lever, at the cam lever in a radial plane so as to be offset by a small angular amount. The dual arrangement of the pins and the recesses enable a relatively large rotation, in whose end regions, which are seldom secured and expire with little energy consumption, only one of the pins may engage optimally with a recess, but in whose central region of rotation that is used almost continuously, both pins can be engaged with both recesses with a good contact pattern. Thus the rotating drive is mechanically sturdy with respect to the stresses that occur and also exhibits good wear performance. Such a rotating drive also fulfills the other aforementioned requirements.

BRIEF DESCRIPTION OF THE DRAWINGS

The drawings show one embodiment of a rotating drive designed according to the invention.

DESCRIPTION OF PREFERRED EMBODIMENT

Figure 1:
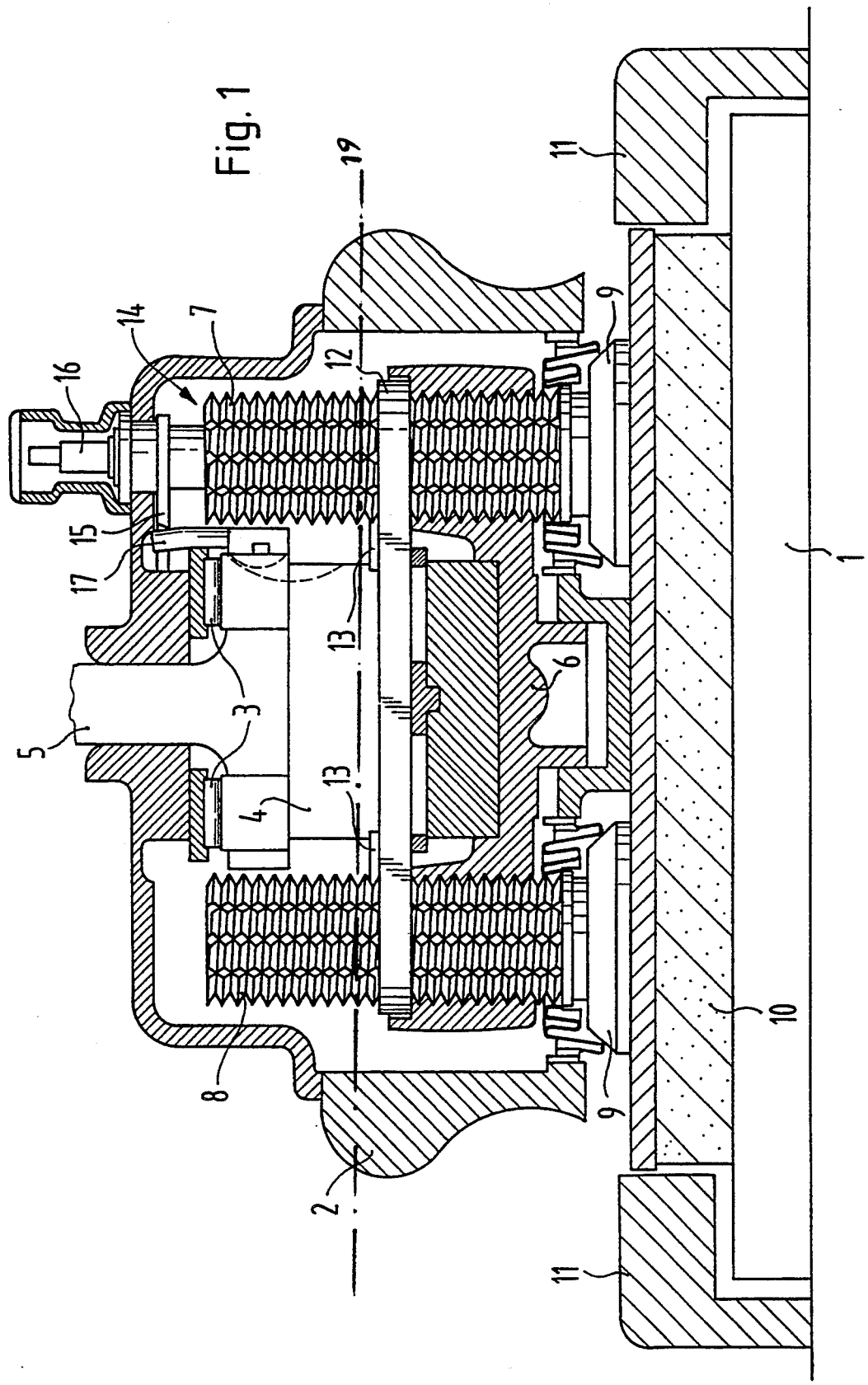
FIG. 1 shows the clamping mechanism of a disk brake of the aforementioned kind, with two adjusting spindles, coupled by means of a synchromesh device, the caliper being shown in section.

FIG. 1 shows a brake disk 1, over which a caliper 2 extends, of which only one part, receiving the clamping mechanism and located to one side of the brake disk 1, is shown. The caliper 2 is designed and mounted by the conventional method in the remaining (not shown) part. In the caliper 2, a cam lever 4 is swivel-mounted by means of roller bearings 3, shaped substantially as half-shells, around an axis of rotation extending parallel to the plane of the brake disk 1. The cam lever 4 is driven by way of a lever 5, whose end can be coupled to the piston of a brake cylinder, mounted on the caliper 2, or to a mechanical brake linkage. It is advantageous for the installation of the disk brake, if the lever 5 extends in essence vertically from the drawing plane of FIG. 1 to the top. On the other hand, the cam lever 4 is coupled by means of its cam to a traverse 6, which extends parallel to the plane of the brake disk 1 within the caliper 2 and can be moved perpendicularly to this plane. Each of the two ends of the traverse 6 is screwed adjustably to one adjusting spindle 7 or 8; the two adjusting spindles 7 and 8 extend within the caliper 2 perpendicularly to the plane of the brake disk 1 and terminate facing it with thrust pieces 9, against which abuts a brake lining 10, which can be pressed against the brake disk 1. The brake lining 10 can be moved especially in the circumferential direction of the brake disk 1 at mountings 11 transversely to the brake disk 1. Mounting 11 may belong, as usual, to the caliper 2 or a stationary brake anchor plate. The two adjusting spindles 7 and 8 have axial teeth, which intersect the thread of the spindles and with which a toothed belt 12 meshes that couples together the two adjusting spindles 7 and 8 in a twist-proof manner. The traverse 6 has holding members 13 to guide the toothed belt 12. The toothed belt or a chain mat also run by way of gears, which mate with the adjusting spindles.

The adjusting spindle 7 (on the right in FIG. 1) is provided with an adjusting drive 14, which is located essentially in an axial open recess, in the adjusting spindle 7 which faces away from the brake disk, projects facing away from the brake disk out of the adjusting spindle 7, there carries a radially protruding drive lever 15, and terminates in a drive journal 16, accessable from the outside. The free end of the drive lever 15 interacts with pins 17, which are mounted on the cam lever 4.

The caliper 2 can be moved in the usual manner relatively transversely to the brake disk 1 and carries a brake lining (not shown) which, opposite the brake lining 10, can be forced against the brake disk 1.

Figure 2:
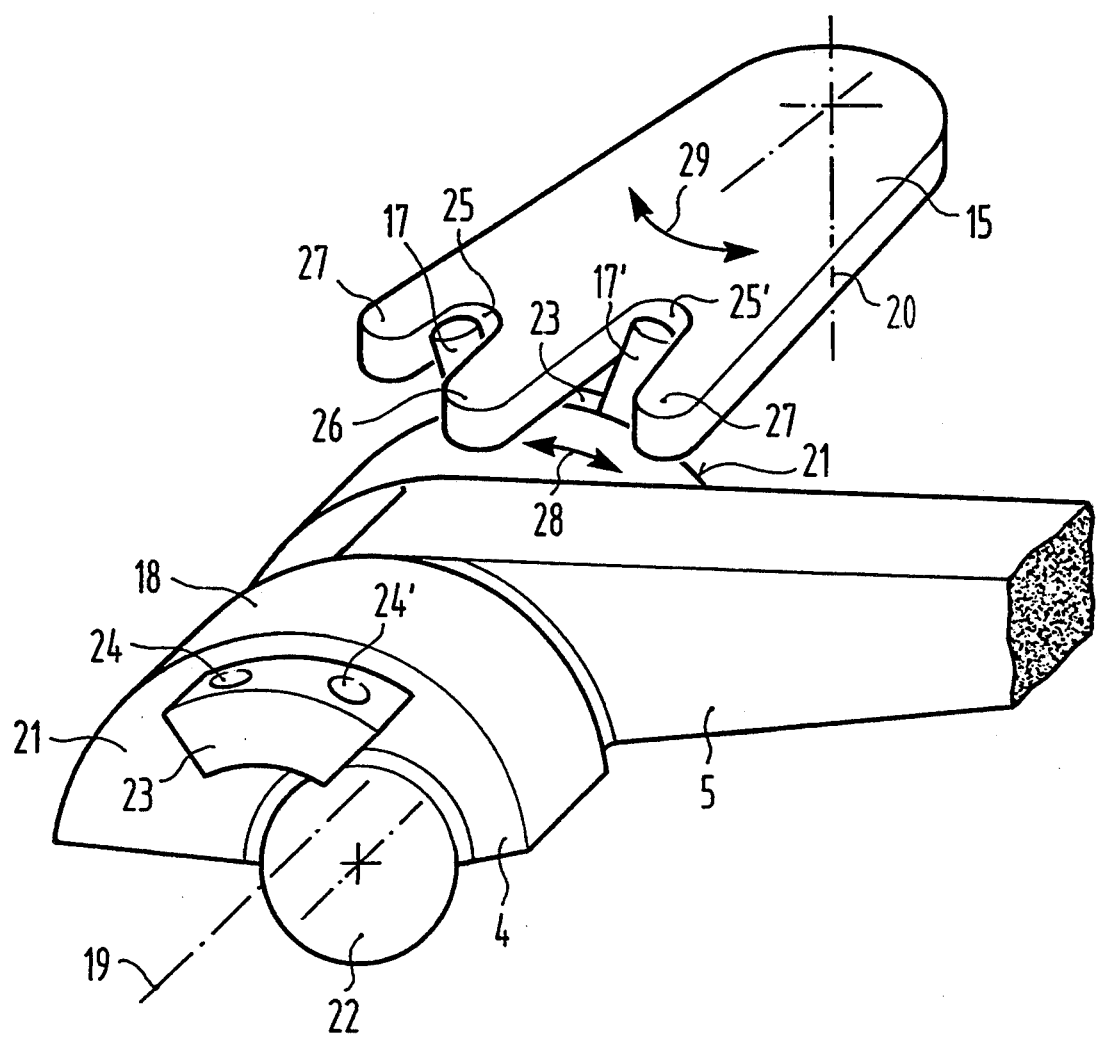
FIG. 2 alone is a perspective view of the rotating drive.

FIG. 2 is a perspective view of the relative positions of the cam lever 4 and the drive lever 15. The cam lever 4 can be rotated by means of its roller bearing 3 (not shown in FIG. 2), interacting with the substantially semi-cylindrical surface 18, around an axis 19, which crosses, at right angles and at a distance, the axis 20 around which thus the drive lever 15 can be rotated and which forms the axis of the adjusting spindle 7 and the reset drive 14. On both sides of the axial faces 21, the cam lever 4 is provided opposite its cam 22, designed as a cylindrical roller, with a curved, axially protruding cantilever 23. Each cantilever 23 has in a radial plane two radial bores 24, 24′, which are offset by a small angular amount; the angle between bores 24 and 24′ is between 10° to 40°, and preferably between about 20° to 30°. The pins 17 and 17′, which protrude radially relative to the axis 19, are mounted in the bores of the cantilever 23 facing the drive lever 15. Each free end of the pins 17 and 17′ engages with a fork recess 25 or 25′, which is situated on the end of the drive lever 15 that faces away from the axis 25 and is defined on the side by a common, central fork tine 26 or one lateral fork tine 27 each; thus, the pin-sided end of the drive lever 15 is designed as a double fork.

It can be inferred from FIG. 2 that, when the cam lever 4 is rotated around its axis 19 in the direction of the arrow 28, the drive lever 15 is rotated correspondingly around its axis 20 in the direction of arrow 29. The arrangement is such that in the normal swivel range, i.e., during braking, which starts from the release state with at least approximately correct release play of the disk brake and during which the brake lining experiences only normal, small abrasion, both pins 17 and 17′ extend into the fork recesses 25, 25′, whose bases are rounded, and interact with the respective fork tines 26 or 27. The double pin engagement allows relatively high torque to be transferred with little wear. The wear can be minimized with suitable surface treatment—hardening—of the pins 17, 17′ and the fork tines 26, 27. For larger angles of rotation of the cam lever 4, which can be generated, for example, in special cases after changing the lining, it is possible that only one of the pins 17, 17′ remains engaged with the drive lever 15, while the other pin 17, 17 escapes from its fork recess 25′ or 25. Since in these cases, however, only small torques are to be transferred and additionally these situations rarely occur, the functionality and service life of the rotating drive is not negatively affected.

The arrangement of the cantilever 23 on both sides of the cam lever 4 is expedient so that the same cam lever 4 can always be used, independently of the design of the disk brake. Thus the adjusting drive 14 can be provided not only according to FIG. 1 at the adjusting spindle 7, but additionally or solely at the adjusting spindle 8; in that event, only the bores 24, 24′ concerned need be fitted with pins 17, 17′.

What is claimed is:

1. A rotating drive for an adjusting spindle (7) of a disk brake for motor vehicles, said disk brake comprising a caliper (2) which extends over a brake disk (1) and is provided on one side thereof with a clamping mechanism;

said clamping mechanism comprising a cam lever (4) adapted for pivoting movement about an axis of rotation (19) extending parallel to a plane of said brake disk (1);

said cam lever (4) comprising a cam (22) which is coupled to at least one adjusting spindle (7) in a direction of clamping movement at least substantially at a right angle to said plane of said brake disk (1);

said at least one adjusting spindle (7) extending at least approximately at a right angle to said plane of said brake disk (1) and being adjustably screwed to one of said cam (22) and an intermediate piece (6), said at least one adjusting spindle (7) comprising an adjusting drive (14) non-rotatably coupled with a drive lever (15) for adjustment of play between said brake disk (1) and said brake lining (1);

said intermediate piece (6) having a disc-sided end and being movable by said cam (22) for bracing a brake lining (10) against said brake disk-sided end;

said brake lining (10) being movable transversely of said caliper (2);

two radially protruding pins (17, 17′) being disposed on said cam lever (4) in a radial plane on an axial face, said two pins (17, 17′) being offset from each other by about 10° and 40°, said drive lever (15) comprising two transversely offset recesses (25, 25′), and an end of each one of said two radially protruding pins (17, 17′) engaging with a corresponding one of said two recesses (25, 25′).

2. Rotating drive according to claim 1, wherein said cam lever (4) bears on at least one axial face (21) of said cam lever a curved, axially protruding cantilever (23), said cantilever in a radial plane thereof comprising two radial boreholes (24, 24′), which are offset by said angular amount in order to mount said two pins (17, 17′).

3. Rotating drive according to claim 1 or 2, wherein said drive lever (15) comprises a forked, pin-sided end, whereby one of said two pins (17, 17′) reaches into each of the fork recesses (25, 25′) defined by a lateral fork tine and a central fork tine (27 or 26).

4. Rotating drive according to claim 3, wherein a base of each fork recess (25, 25′) is rounded.

5. Rotating drive according to claim 1 or 2, wherein said pins are offset by 20° to 30°.

* * * * *